United States Patent
Farrand (10) Patent No.: US 7,391,808 B1
(45) Date of Patent: Jun. 24, 2008

(54) SYSTEM AND METHOD FOR UPGRADING PROCESSING CAPABILITIES OF A MEDIA CENTER

(75) Inventor: Tobin Farrand, Los Altos Hills, CA (US)

(73) Assignee: Digeo, Inc., Kirkland, WA (US)

(*) Notice: Subject to any disclaimer, the term of this patent is extended or adjusted under 35 U.S.C. 154(b) by 997 days.

(21) Appl. No.: 10/404,837

(22) Filed: Mar. 31, 2003

(51) Int. Cl.
*H04B 1/66* (2006.01)

(52) U.S. Cl. .................... 375/240.12; 375/240.25; 375/240.24; 375/240.26; 375/240.02; 382/233; 382/235; 382/239; 709/203; 709/201

(58) Field of Classification Search .......... 375/240.12, 375/240.02, 240.24, 240.25, 240.26; 382/233, 382/235, 239; 709/203, 201
See application file for complete search history.

(56) References Cited

U.S. PATENT DOCUMENTS 6,618,442 B1 * 9/2003 Chen et al. ............ 375/240.2
7,185,049 B1 * 2/2007 Benitez et al. ............ 709/203

* cited by examiner

Primary Examiner—Shawn An
(74) Attorney, Agent, or Firm—Darby & Darby PC; Bruce E. Black (57) ABSTRACT

Video data encoded according to new compression standards may be processed by an existing client terminal using an adaptive module that transcodes the video data into a format compatible with the processing capabilities of the client terminal. Further, the adaptive module may compress video files stored in the client terminal according to a new or advanced compression standard, in order to expand the storage capacity of the hard drive of the client terminal. Further still, the adaptive module may support high-resolution graphic video streams (e.g., for interactive games) by including a graphics engine and encoder to render the video streams compatible for processing by the client terminal. Thus, broadband content providers are spared the expense of upgrading the decoder and/or hard drive of their subscribers' terminals, if not the entire client altogether, in view of evolving compression standards.

9 Claims, 10 Drawing Sheets

SYSTEM AND METHOD FOR UPGRADING PROCESSING CAPABILITIES OF A MEDIA CENTER

FIELD

The present invention relates generally to the field of multimedia entertainment systems. In particular, the present invention relates to upgrading the video processing capabilities of a multi-media entertainment system to accommodate different data compression/decompression standards (alternatively referred to as "codecs"), and a corresponding system and method.

BACKGROUND

In the context of a cable television (CATV) system or a direct broadcast satellite (DBS) system, a set-top-box (STB) is a client terminal that receives and decodes television signals for display on a separate display device, such as a television (TV) set. The client terminal may even be integrated into the display device. Further, the television signals may include digital audio and video image signals provided in encoded media streams broadcast from a content provider.

The useful life of a deployed STB may be several years, e.g., 5-7 years. However, rapid advancements in technology and standards associated with the content and services delivered to STBs may render these devices obsolete prematurely in the absence of significant upgrades. Further, since the task of upgrading STBs would, most likely, be conducted on a massive scale, the upgrades must be deliverable in a cost-efficient manner.

For example, MPEG-2 is the compression standard by which digital video content is compressed on storage mediums, e.g., CDs and DVDs, and for broadcast by multiple systems operators (MSOs), such as cable television (CATV) and direct broadcast satellite (DBS) systems. However, applications relating to digital video are increasing, e.g., video-on-demand (VOD), as is the corresponding need for bandwidth. As a result, advanced compression standards are being developed to provide, within existing data transport infrastructures, sufficient bandwidth for digital video content corresponding to the growing number of applications for digital video content.

Since many current business models include STBs being deployed by MSOs, consideration has been given to simultaneously broadcasting content using both presently accepted compression standards, i.e., MPEG-2, and advanced compression standards. However, the overhead required for such simulcasting is cost-prohibitive. Therefore, the challenge for STB manufacturers and providers, mentioned above, is to upgrade the decoding capabilities of deployed STBs, in order to decode digital video data content encoded according to these advanced compression standards, in a cost-effective manner.

BRIEF DESCRIPTION OF THE DRAWINGS

The scope of the present invention will be apparent from the following detailed description, when taken in conjunction with the accompanying drawings, and such detailed description, while indicating preferred embodiments of the invention, are given as illustrations only, since various changes and modifications will become apparent to those skilled in the art from the following detailed description, in which.

DETAILED DESCRIPTION

Figure 1:
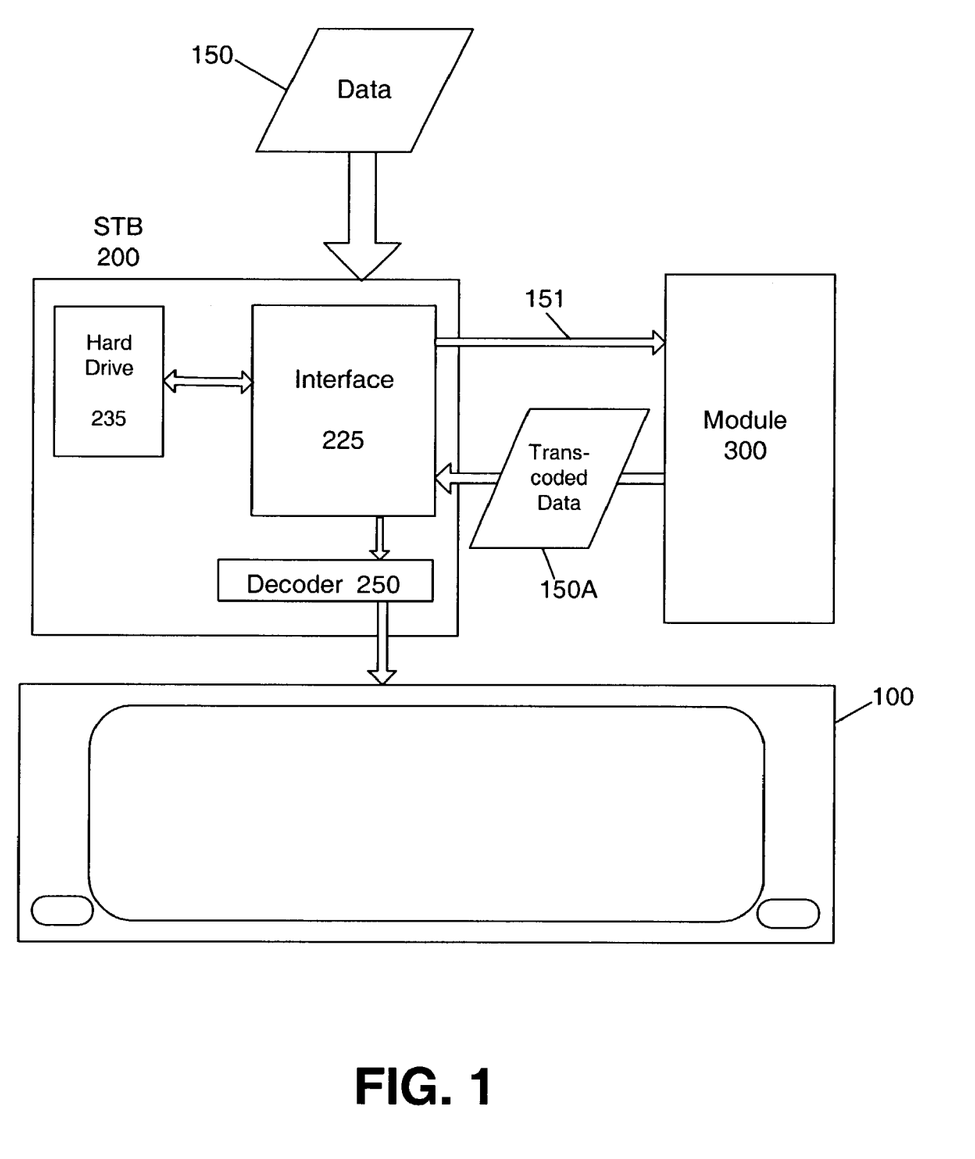
FIG. 1 is a block diagram illustrating a generalized embodiment of a module incorporating the invention, and the operating environment in which various aspects of the illustrated invention may be practiced.

FIG. 1 shows a block diagram illustrating an inventive embodiment of a system for processing media data that is encoded according to either an existing compression standard or a new compression standard. More particularly, STB 200 may receive from module 300 transcoded media content 150A that is encoded according to either of an existing or a new compression standard to provide digital video content to a user, via TV 100. Further, module 300 may provide transcoded media content 150A to STB 200 to upgrade the storage capabilities of hard drive 235.

The present description includes multiple references to "existing" and "new" compression standards. Currently, MPEG-2 is widely accepted as the norm for encoding digital video content, in both broadcast and storage form, and therefore any reference to an "existing" compression standard is understood to include, but not be limited to, MPEG-2, unless otherwise noted. Further, any reference to a "new" compression standard is understood to include, but not be limited to: an advanced compression standard such as Joint Video Technology (hereafter referred to as "JVT"), which is also known as any one of MPEG-4 part 10, H.26L, or H.264. By the JVT compression standard, as adopted by either one of The Telecommunication Standardization Sector of The International Telecommunications Union, and the International Standardization Organization/International Electrotechnical Commission, Joint Technical Committee, video data signals are encoded in accordance with one of multiple compression algorithms, each at a lower data rate than MPEG-2; Windows Media Video 8, developed by the Microsoft® Corporation; and RealVideo 9™ developed by Real™ Networks.

In view of advancing codec standards for digital video image signals, in the context of broadcast- and interactive-TV, video streaming, as well as video image storage mediums such as CDs and DVDs, the exemplary inventive embodiments described herein may eliminate the need for STB providers to implement comprehensive strategies for reconfiguring or replacing currently deployed STBs, or components thereof, in order for the devices to process digital video image signals encoded according to a new compression standard. In one embodiment, when an MSO transmits transport data stream 150 that includes digital video signal 151 encoded using a new compression standard that cannot be decoded by STB decoder 250, STB interface 225 transmits the incompatible digital video signal 151 to adaptive module 300 for transcoding into an existing compression standard that the STB decoder 250 is capable of decoding. In one embodiment, adaptive module 300 transcodes digital video signal 151 into an existing compression standard, but at a higher data rate to preserve the quality of the original digital signal 151.

In one embodiment, module 300 may further serve to upgrade the storage capabilities of hard drive 235 on existing STBs 200 without having to reconfigure or replace the hard drive 235. For instance, a media data file that has been encoded according to an existing compression standard and stored on hard drive 235 of STB 200, may be streamed, via interface 225, to module 300 for transcoding to a new compression standard. The transcoded data 150A may be streamed back to STB 200 where it is again stored as a media data file in hard drive 235, occupying less of the hard drive capacity than when it was encoded according to the existing compression standard. Further, to play back the media data file, interface 225 retrieves the media data file from hard drive 235 for streaming to module 300, where the media data file may be transcoded back to the existing compression standard. In one embodiment, adaptive module 300 transcodes digital video signal 151 into an existing compression standard, but at a higher data rate to preserve the quality of the transcoded media data file.

Explanation of these and other embodiments further to the system of FIG. 1 follows. Where features of the respective example embodiments are common to those shown in the system overview of FIG. 1, reference numbers may be repeated. In addition, although the present invention may have application to the processing of both audio and video data signals, the following description will be provided in the context of video data signals.

Figure 2:
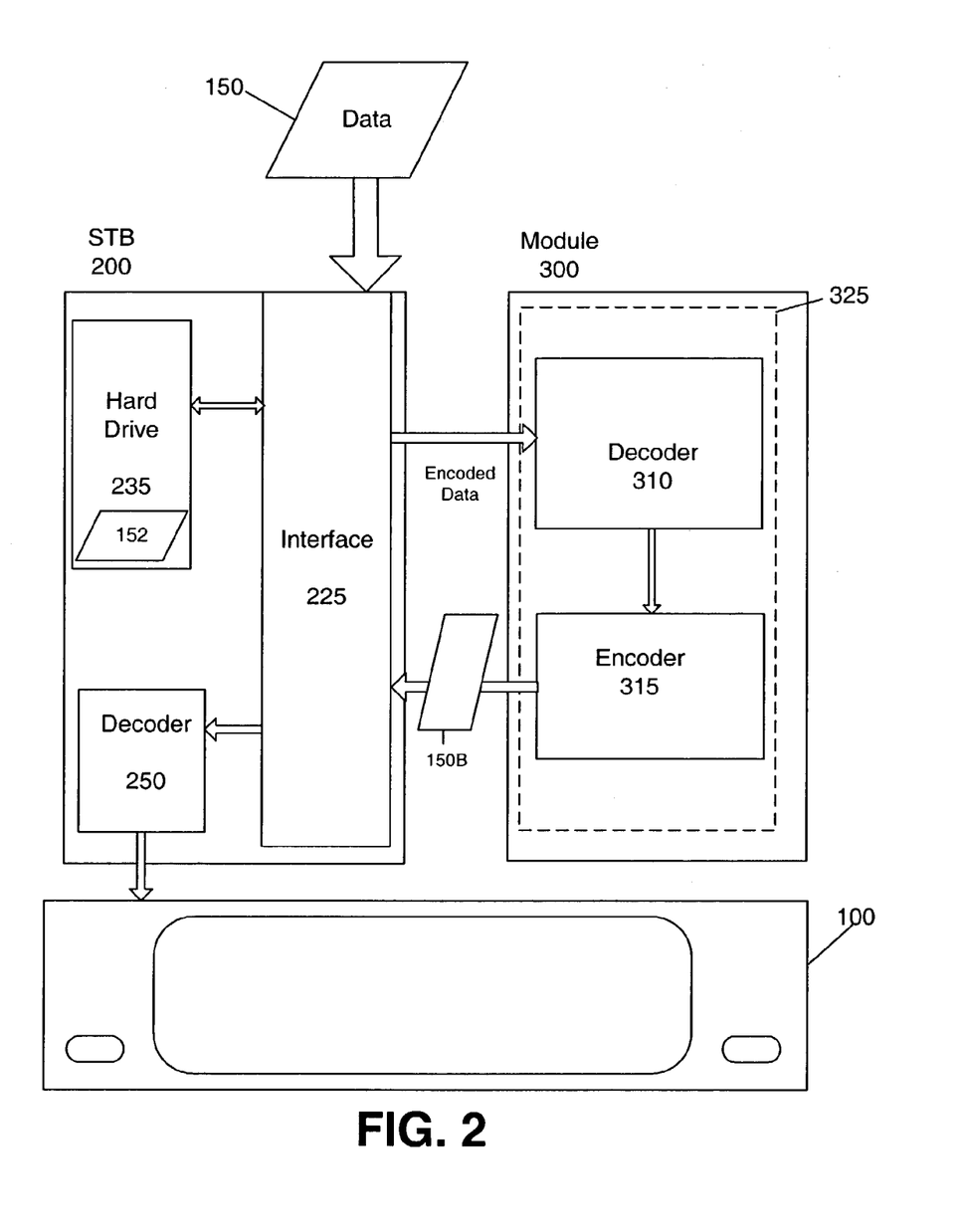
FIG. 2 is a block diagram showing an example embodiment of the invention further to FIG. 1.

FIG. 2 shows an example embodiment corresponding to the system of FIG. 1 to enable STB 200, which may also be referred to as a "client terminal," a "media center," or a "multi-media entertainment system," to process video data signals encoded in accordance with a new compression standard.

STB 200 is a client terminal that includes interface 225, hard drive 235 and decoder 250. An MSO (not shown) may broadcast to interface 225 transport media stream 150, which may include multiple layers of data including, but not limited to, a video data layer, an audio data layer, and a system data layer. The system data layer may include meta-data to define file and file access formats corresponding to the video and audio data layers.

When interface 225 receives transport media stream 150 from an MSO, interface 225 may transfer a corresponding layer of video data signals to decoder 250 for decoding into raw video for display on TV 100. However, the decoders 250 in presently deployed STBs are capable of decoding only video data signals encoded according to an existing compression standard, i.e., MPEG-2, and therefore are not capable of decoding any video data signals received from interface 225 that are encoded in accordance with a new compression rate.

Therefore, if meta-data included in a system layer of transport media stream 150 indicates that the corresponding layer of video data signals is encoded in accordance with a new compression rate, interface 225, which may be either of a USB2.0 or P1394 interface, may stream the layer of video data signals to module 300. The video data signals may be received at module 300 by transcoder 325A, via a corresponding USB2.0 or P1394 port (not shown), for transcoding to the existing compression standard. Interface 225 may similarly stream video data signals received from a digital data medium, including, but not limited to, a digital versatile disc (DVD) or compact disc (CD) to module 300, if meta-data from the medium indicates that the accompanying video data signals are encoded in accordance with a new compression standard.

In the example embodiment of FIG. 2, transcoder 325 may include adaptive decoder 310 to determine the new compression standard algorithm by which the video data signals are encoded, and, accordingly, decode the video data signals streamed from interface 225 into raw video data signals. Since raw video data signals require a magnitude of bandwidth greater than that which the USB2.0 or P1394 port is capable of providing for streaming back to STB 200, transcoder 325 may further include adaptive encoder 315 to encode the raw video data signals according to the existing compression standard. In one embodiment, to provide the user with an enhanced media experience, i.e., to preserve the quality of the original video data signal 151, adaptive encoder 315 produces an I-frame only MPEG-2 video stream 150B that is streamed back via the USB2.0 or P1394 port to interface 225 of STB 200. Once received at interface 225, transcoded video data stream 150B may be transferred for decoding by decoder 250, and display by TV 100.

I-frame only refers to a video compression scheme in which each frame is intra-frame compressed, i.e., each frame is individually defined and does not depend on other frames. As the name suggests, there are no P (predictive) or B (bi-directional) frames in an I-frame only compression scheme. Although I-frame only compression results in a higher data rate than that of ordinary MPEG-2 encoding, it is still well within the bandwidth that USB2.0 or P1394 interfaces are capable of handling. Moreover, I-frame only MPEG-2 encoding avoids any latency, and further may advantageously permit the use of a less expensive device for adaptive encoder 315, because the device need only be capable of encoding I-frames, and not a P- or B-frame.

The example embodiment of FIG. 2 also shows an example embodiment corresponding to the system of FIG. 1 to implement the transcoding of video data files that are stored in hard drive 235 of STB 200, thus increasing the storage capacity of hard drive 235. In particular, if hard drive 235 contains a video data file that has been compressed according to the existing compression standard, one of ordinary skill may recognize that such video data file would occupy a lesser portion of the storage capacity of hard drive 235 if it were encoded at a lower data rate, that is, if it were compressed in accordance with a new compression standard. For example, if MPEG-2 is the existing compression standard by which a digital video file stored is compressed for storage in hard drive 235, the digital video file may have been compressed at a rate of 19.4 Mbps. Accordingly, if hard drive 235 has an exemplary storage capacity of 80 MB, hard drive 235 may be able to store approximately 7.5 hours of digital video content. Alternatively, using JVT as the new compression standard, a digital video file stored in hard drive 235 may be compressed at a rate of 5 Mbps with little or no perceived loss of quality. Accordingly, an exemplary 80 MB hard drive 235 may be able to store approximately 30 hours of digital video content.

In order for a video data file stored in hard drive 235 to be transcoded according to a new compression standard, the digital video file 152 may be retrieved by interface 225 for streaming to transcoder 325, via the existing USB2.0 or P1394 port. In an example embodiment, transcoder 325 includes decoder 310 to determine the algorithm by which the media data file is encoded, and to decode the video data signals streamed from interface 225 into raw video data signals. Transcoder 325 further includes encoder 315 to encode the raw video data signals received from decoder 310 according to any one of the multiple algorithms corresponding to a new compression standard, e.g., JVT, Windows Media 8, or RealVideo 9. The re-encoded data is then streamed back to interface 225, where the contiguous data of video stream 150B is re-configured as digital video file 152, and stored again in hard drive 235.

In one embodiment, playing back the transcoded video data file 152 requires that the digital video file 152 be retrieved by interface 225 for streaming to transcoder 325, via the aforementioned USB2.0 or P1394 port. Transcoder 325 includes decoder 310 to be notified of the advanced-compression standard algorithm by which the video data file has been encoded, and thus decode the video data file into raw video data signals. In one embodiment, to preserve the quality of the original digital video file 152, encoder 315 produces an I-frame only MPEG-2 video stream 150B that is streamed back to interface 225 of the USB2.0 or P1394 port. As set forth above, I-frame only MPEG-2 encoding advantageously reduces the costs for encoder 315, which is required to encode only I-frames. Once received at interface 225, transcoded video data stream 150B is transferred to decoder 250 for decoding, and display on TV 100.

Figure 3:
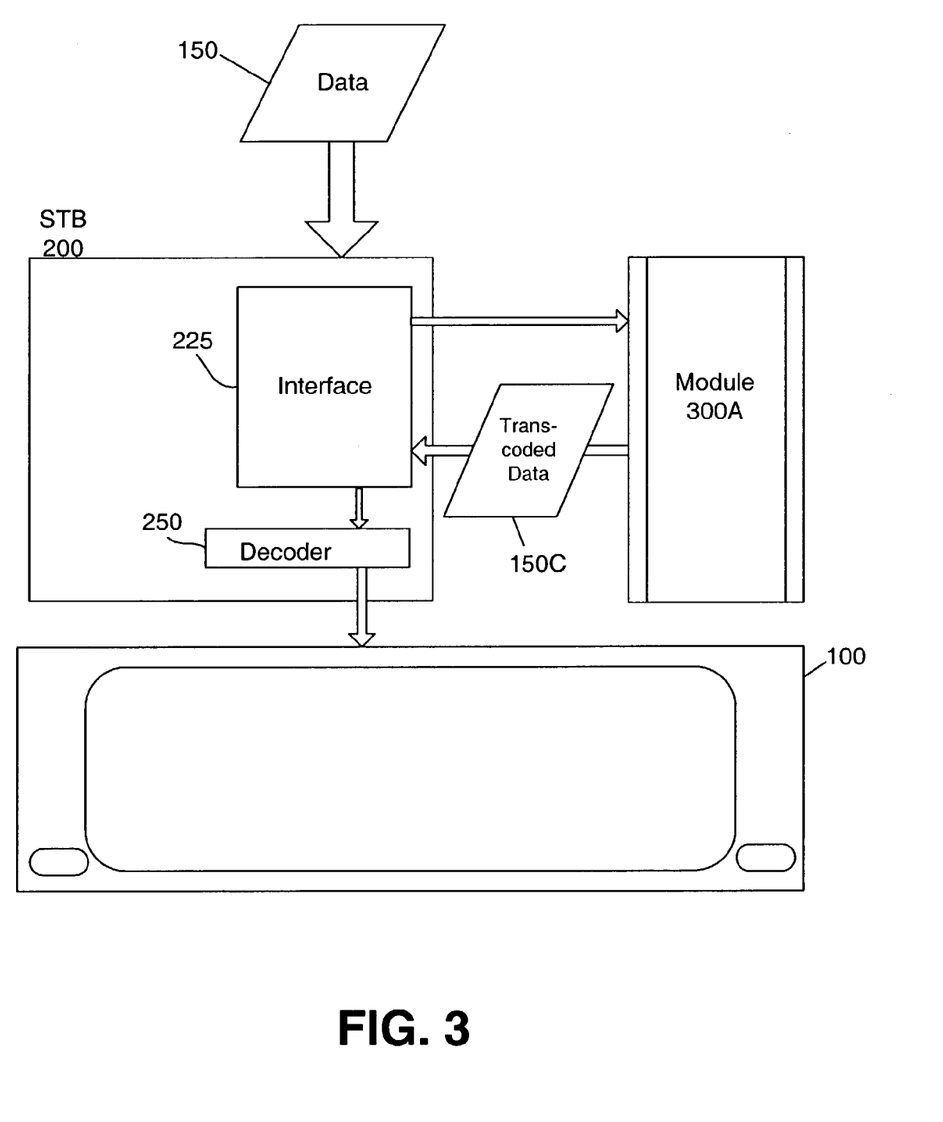
FIG. 3 is a block diagram showing an example embodiment further to FIG. 1.

FIG. 3 shows an alternative embodiment of the transcoder module shown in FIG. 2. More specifically, the transcoding of the video data signals from a new compression standard to the existing compression standard, as described above in reference to FIG. 2, may alternatively be performed by a software transcoder module 300A, as shown in FIG. 3. Transcoder module 300A may determine the advanced-compression standard algorithm by which the video data signals are encoded, and accordingly execute a transcoding algorithm to mathematically transform the received video data signals from the advanced-compression standard to the existing compression standard. Consequently, in one embodiment, transcoder module 300A may directly produce, for example, an I-Frame only MPEG-2 video stream 150C that may be streamed back, via the USB2.0 or P1394 port, to interface 225 of STB 200. Once received at interface 225, transcoded video data stream 150C may be transferred to decoder 250 for decoding, and then for display on TV 100.

Similarly, the software transcoder module 300A shown in FIG. 3 may enable the transcoding described above in reference to transcoder 325 of FIG. 2. That is, transcoder module 300A may execute a transcoding algorithm to perform the mathematical transformation for the transcoding described above in reference to transcoder 325.

Figure 4:
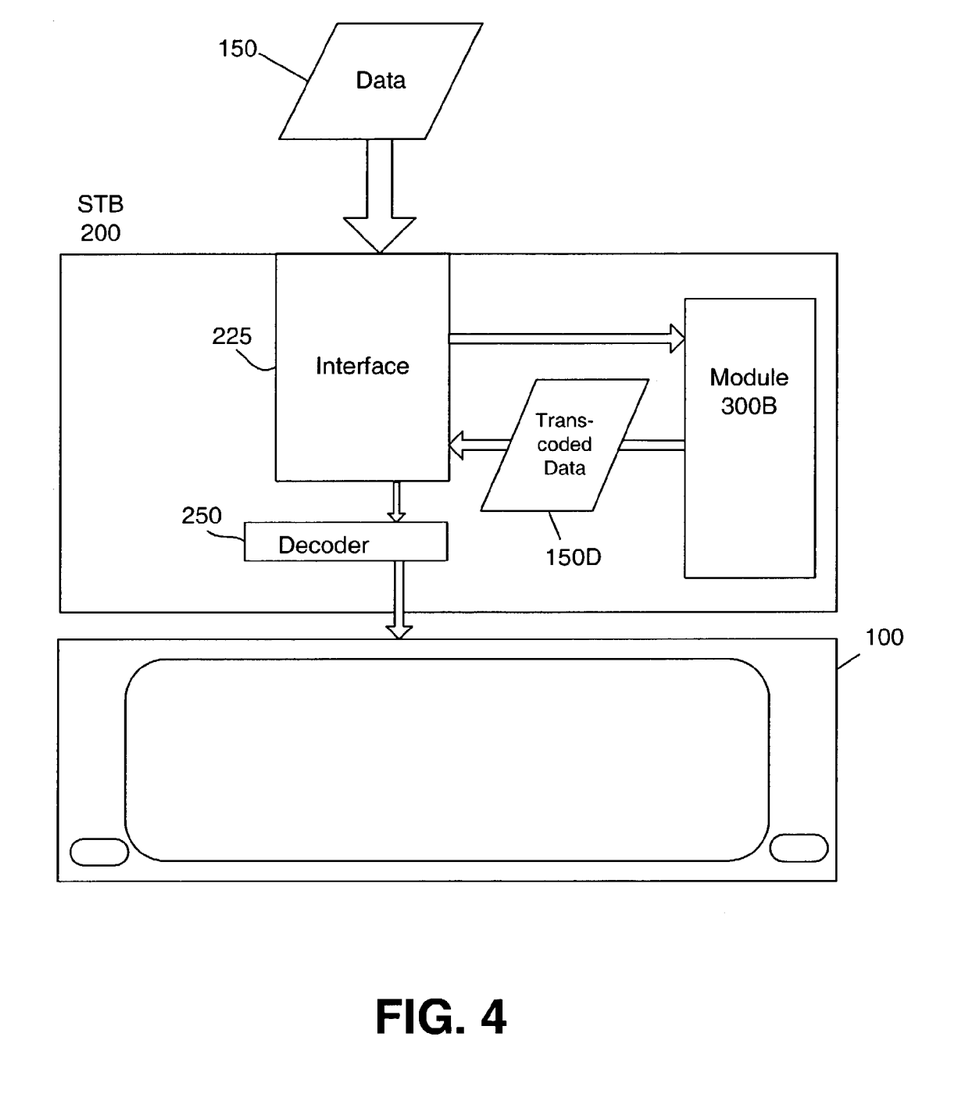
FIG. 4 is a block diagram showing an example embodiment further to FIG. 1.

Further still, all of the transcoding of the video data signals 151 from one compression standard to another existing compression standard, as described above may be performed by local transcoder module 300B, as shown in FIG. 4, resulting in transcoded data 150D being streamed back to interface 225. Local transcoder module 300B may be integrated with STB 200, and be provisioned to perform as transcoder 325 described above in reference to FIG. 2, or as software-based transcoder module 300A described above in reference to FIG. 3.

Figure 5:
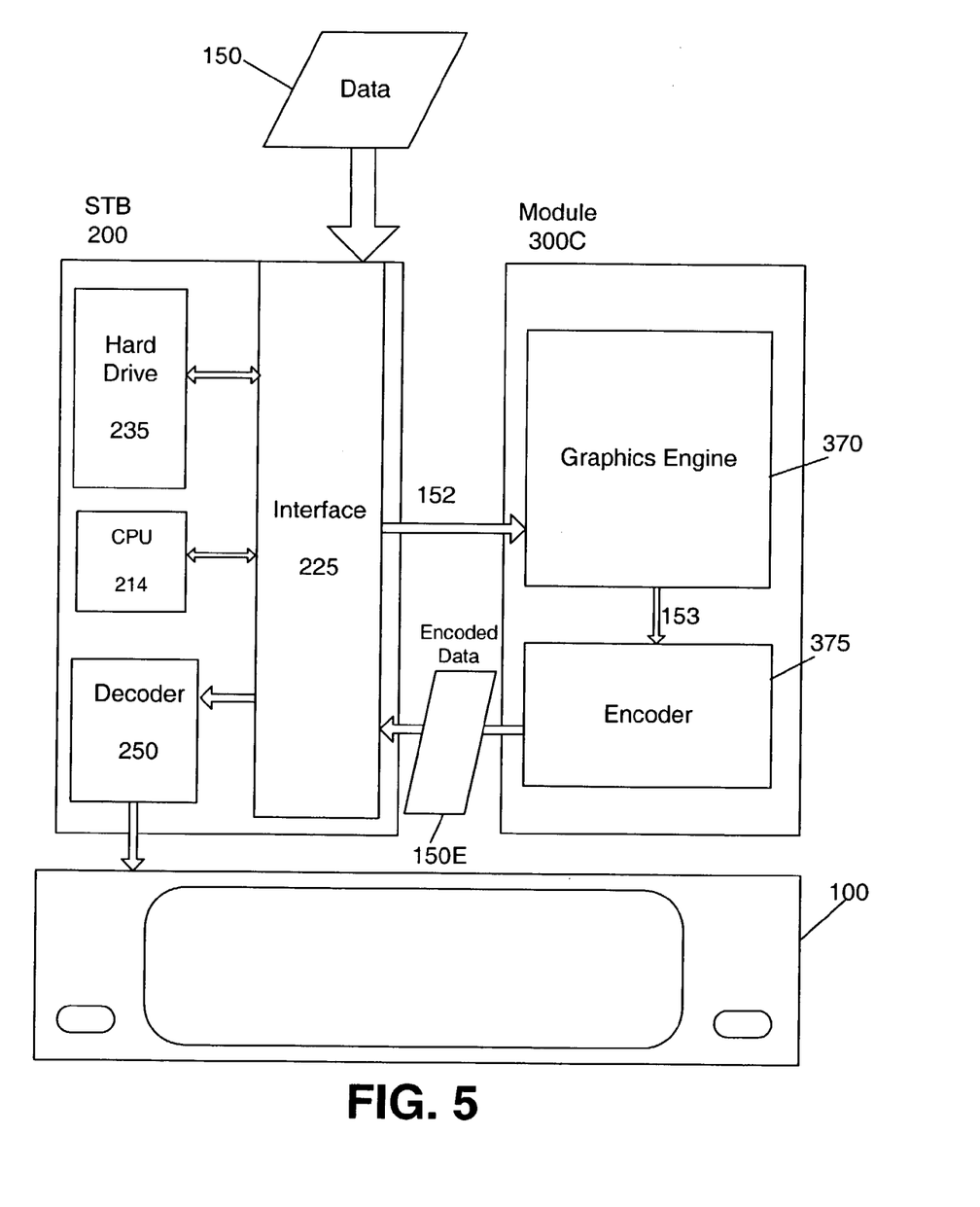
FIG. 5 is a block diagram showing an example embodiment further to FIG. 1.

A further inventive embodiment is shown in FIG. 5, wherein adaptive module 300C may render high-resolution graphics in the context of, for example, interactive video. This embodiment may enable a user of STB 200 to engage in interactive gaming, with the user of STB 200 playing against herself or against other, on-line participants.

An interactive gaming program may be downloaded from an MSO to STB 200, or a gaming program may otherwise be contained on a CD/DVD inserted to a disc drive (not shown) on STB 200. In either case, a gaming program may include a sophisticated graphics program, and therefore interface 225 may stream graphics data to graphics engine 370 in module 300C, via a corresponding USB2.0 or P1394 port, for the purpose of rendering graphics for a game. User input, including input from a user's gaming control device or input from an on-line opponent received at STB 200, e.g., via IP packets, may be processed by CPU 214, and such input may further be transmitted to graphics engine 370 for rendering a next graphics frame for the interactive game.

In the example embodiment of FIG. 5, transcoding is further understood to include encoding rendered graphics in accordance with an existing compression standard. In the example embodiment, graphics engine 370 receives user input 152 from interface 225, and applies the input instructions to the current state of the rendered graphics to render the next graphics frame 153. Encoder 375 encodes the rendered graphic frame 153 according to the existing compression standard, e.g., MPEG-2, and the encoded graphics 150E are streamed back to STB decoder 250, via interface 225, for decoding into raw video data, and displayed on TV 100. Such rendering and encoding is performed rapidly for subsequent graphics frames to avoid any latency due to the interactive nature of many video games. In one embodiment, to preserve the high quality of the rendered graphics 153, the encoder 375 produces an I-frame only MPEG-2 video stream 150E that is streamed back via the USB2.0 or P1394 port to interface 225 of STB 200. Once received at interface 225, the encoded video data signals 150E are decoded by decoder 250 and then displayed on TV 100.

Figure 6:
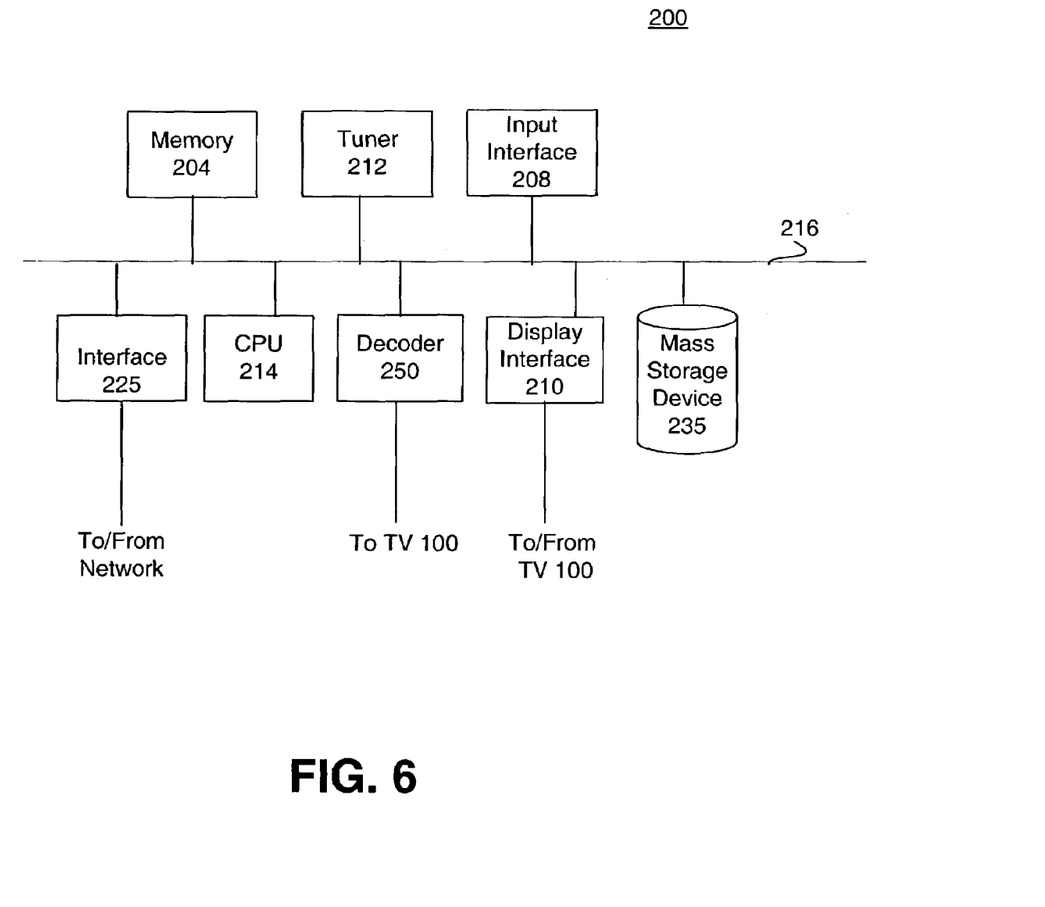
FIG. 6 is a block diagram showing a schematic block diagram of a set-top box (STB), in which aspects of the invention may be practiced.

FIG. 6 provides an example of a schematic block diagram of an STB 200 that may be used in conjunction with the example embodiments of FIGS. 1-5. The illustrated components may be logical or physical and may be implemented using any suitable combination of hardware, software, and/or firmware.

In an example embodiment, STB 200 may include network interface 225 to communicate with a broadband network, such as an MSO. Interface 225 may conform to the DOCSIS (Data Over Cable Service Interface Specification) or DAVIC (Digital Audio-Visual Council) cable modem standards. More particular to the present embodiments, interface 225 may include standard circuitry for receiving MPEG (Moving Picture Experts Group) streams including multiplexed programs and data via the broadband network. Decoder 250 may decode the MPEG streams received by interface 225 in order to present a media experience to the user via TV 100.

STB 200 may further include a memory 204, such as a random access memory (RAM) and/or read-only memory (ROM). Memory 204 may store as an operating system (OS) for STB 200 (e.g., Windows CE® or Linux), application program code, and various other types of data.

Input interface 208 may be provided for receiving commands from an input device, such as a remote control for TV 100 or a game controller used for interactive gaming. STB 200 may further include display interface 210 for generating a user interface on TV 100 or another display device, which may be responsible for tracking user responses to the user interface via the input device. Additionally, display interface 210 may be used to display various types of supplemental information on or in connection with objects or data fields provided on the user interface.

CPU 214 may control operation of STB 200, including the other components described above, which may be in communication with CPU 214 via bus 216. CPU 214 may be embodied as a microprocessor, a micro-controller, a digital signal processor (DSP) or other device known in the art. CPU 214 may perform logical and arithmetic operations based on program code stored within memory 204 or the mass storage device 235.

A description of example transcoding methodologies corresponding to the example embodiments of FIGS. 1-4 follows with reference to FIGS. 7-10. The exemplary transcoding methodology corresponding to FIG. 5, understood to include encoding rendered graphics in accordance with an existing compression standard, is described therein as well. As set forth above, reference to an existing compression standard is understood to include, unless otherwise noted, the MPEG-2 compression standard, which is an ISO standard for compressing video data signals both in broadcast form and in storage mediums, i.e., CDs and DVDs. Further, reference to a new compression standard is understood to include, but by no means be limited to, any one of the advanced-compression standard JVT, which is also known as any one of MPEG-4 part 10 and H.26/H.264, Windows Media 8, or RealVideo 9, as described above. Regardless, it is understood that a new compression standard implies a higher-compression rate than an existing compression standard.

Figure 7:
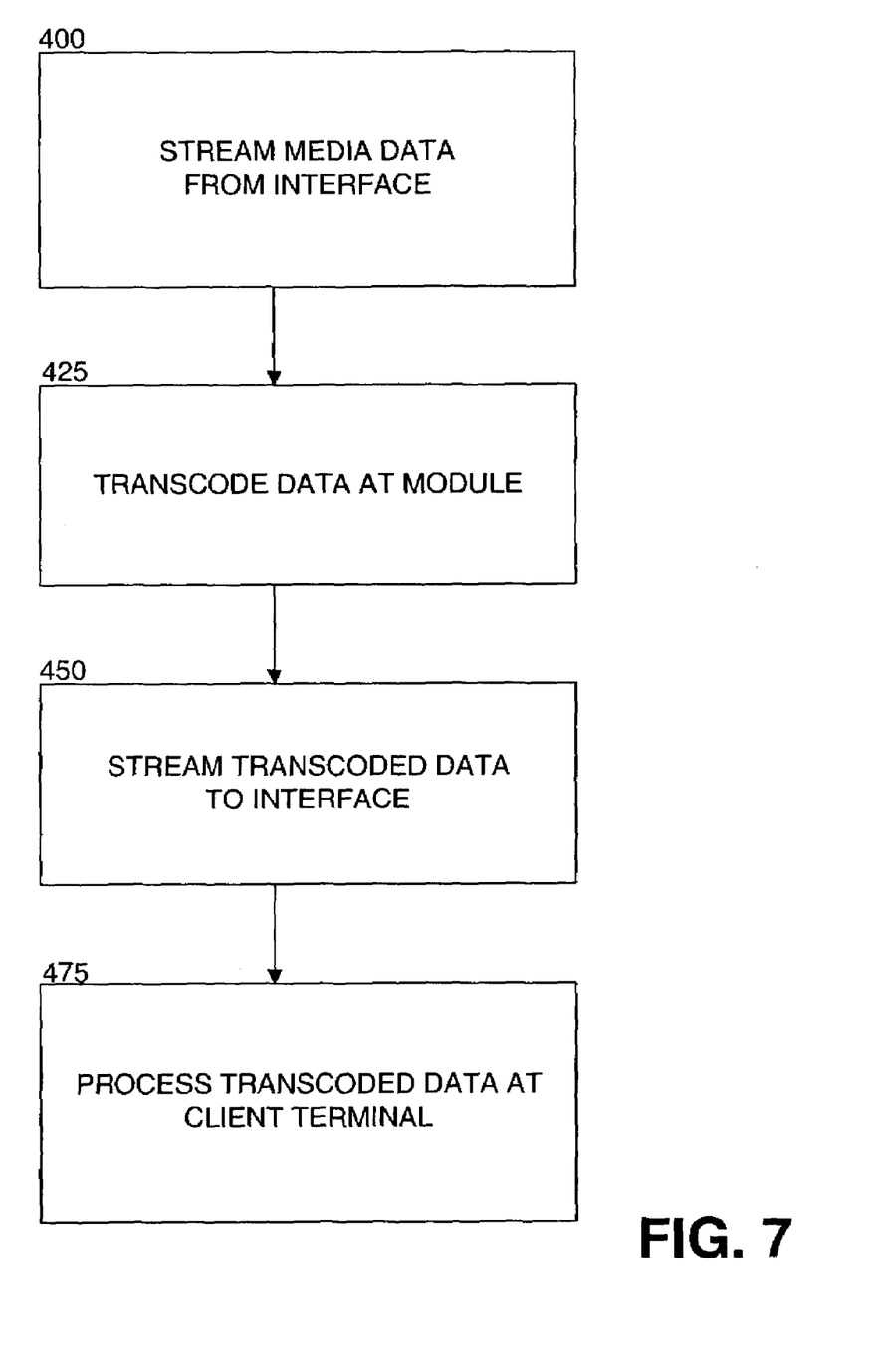
FIG. 7 is an example flow-chart corresponding to an example embodiment.

The flow-chart of FIG. 7 may be applicable to the example embodiments of FIGS. 1-5, described above. In particular, interface 225 may stream 400 data signals from client terminal (STB) 200 to any one of modules 300-300C using an existing interface protocol, including USB2.0, and P1394. Using either of a hardware-based iterative process or a software-based algorithm, in accordance with the above descriptions, any one of modules 300-300B may transcode 425 the codec standard for the received data signals, and the transcoded data signals may be streamed 450 back to interface 225, using the aforementioned interface protocol. Alternatively, for module 300C shown in FIG. 5, transcoding 425 is understood to include encoding rendered graphics in accordance with an existing compression standard. Interface 225 may direct the transcoded data signals to an appropriate STB component for processing 475.

Figure 8:
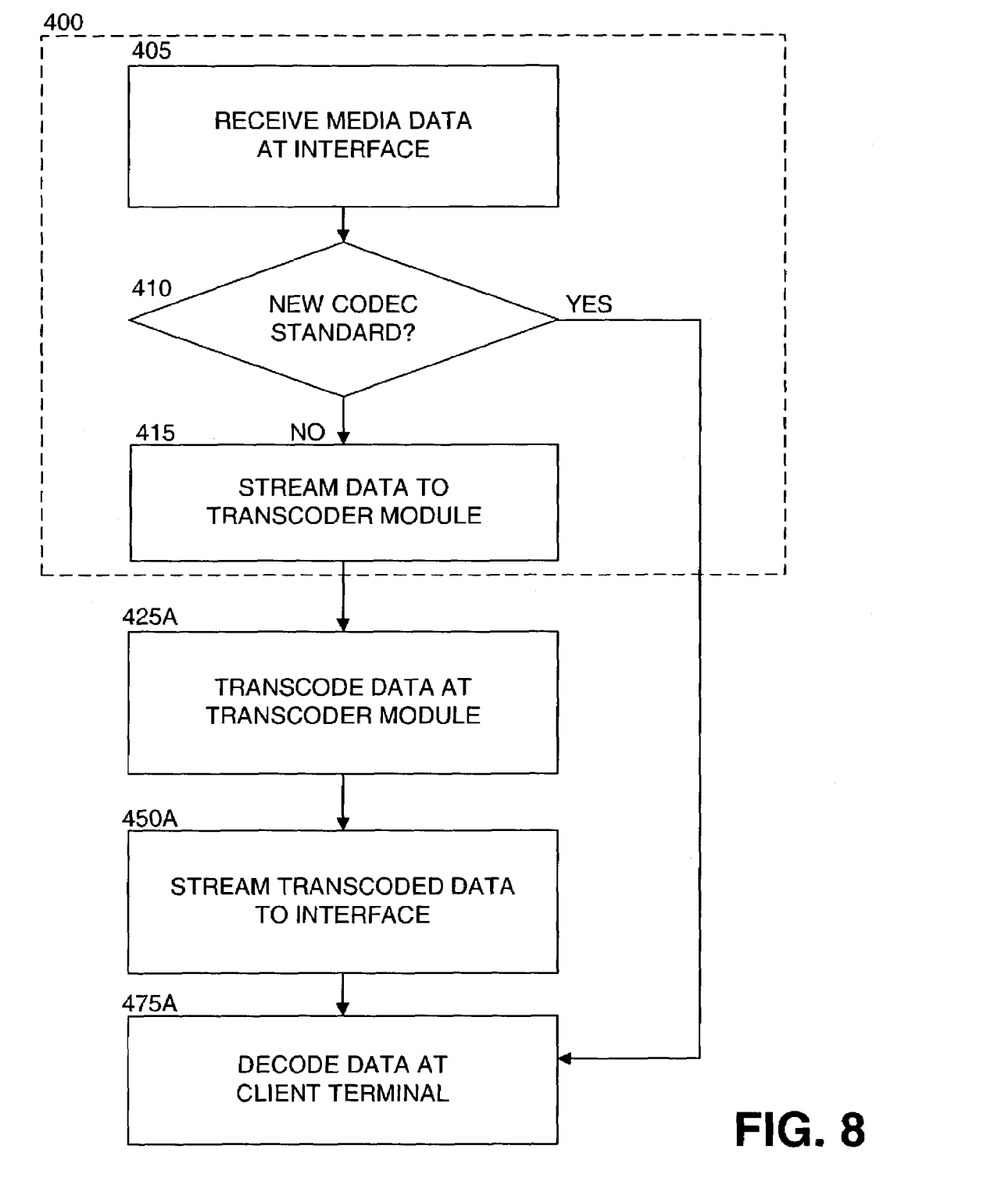
FIG. 8 is an example flow-chart further to the example embodiment of FIG. 7.

In FIG. 8, the streaming 400 of data signals to one of transcoder modules 300-300B may include the transport media stream 150 being received at interface 225 upon broadcast from an MSO. The transport media stream may include, but is not limited to, broadcast programming content. Alternatively, a media stream may be received by interface 225 from a storage medium including, for example, a CD or DVD, inserted to a disc drive on STB 200.

The meta-data in the system layer of the transport media stream 150 may indicate the compression standard for the accompanying video and audio data signal layers. When the compression standard for a data signal layer is the existing compression standard 410, interface 225 may direct the data signal layer to decoder 250 for decoding 475A. As set forth above, the existing compression standard widely accepted for video data signals, in both broadcast and stored form, is the MPEG-2 compression standard.

However, when the compression standard for a data signal layer is a new compression standard 410, the data signal layer may be streamed 415 to one of the transcoder modules 300-300B, shown in FIGS. 1-4. For the example embodiments of FIGS. 1-3, where the transcoder modules 300 and 300A are adaptive modules, the subject data signal layer may be streamed using an existing interface protocol, including, but not limited to, USB2.0 or P1394. For the example embodiment of FIG. 4, where transcoder module 300B is integrated with STB 200, the subject data signal layer may be transferred to transcoder module 300 via bus 216, shown in FIG. 6.

The transcoding 425A of the data signal layer, by either of a hardware-based iterative process or a software-based algorithm, is described in detail above with reference to FIGS. 1-4. In any of FIG. 1, 2, or 4, hardware-based iterative transcoding may include a decoder in the respective one of transcoder modules 300 or 300B receiving the data signal stream from interface 225, determining the new compression standard algorithm by which the data signal stream has been encoded, and, accordingly, decoding the data signal stream from the new compression standard into raw data signals. The raw data signals may be encoded according to the existing compression standard at a high bit-rate, e.g., MPEG-2.

Alternatively, with regards to FIG. 3, and even an example embodiment of FIG. 4, software-based transcoding by transcoding module 300A and 300B may include determining the advanced-compression standard algorithm by which the data signal stream has been encoded, and executing a mathematical transformation of the data signal stream from the advanced-compression standard to the existing compression standard, e.g., MPEG-2. Regardless of the mode of transcoding, the transcoded data signals are streamed 450A back to interface 225. Interface 225 sends the transcoded signals to decoder 250 for decoding 475A so as to deliver the media experience to the user, most likely on TV 100. The media experience may also be displayed for the user on, for example, a PC, a PDA, and mobile telephone.

Figure 9:
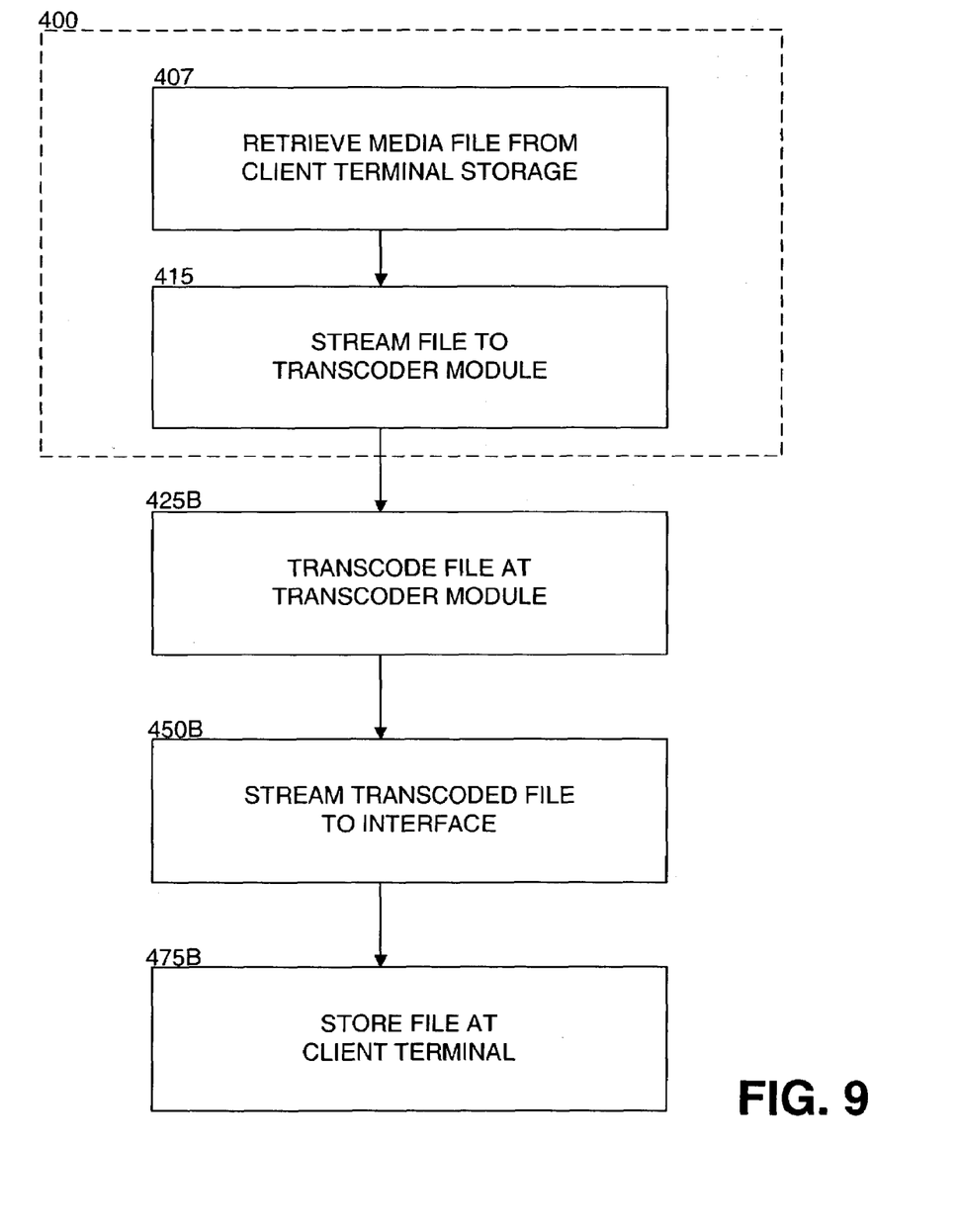
FIG. 9 is an example flow-charter further to the example embodiment of FIG. 7.

FIG. 9 may be applicable, at least, to upgrading the storage capabilities of STB 200. If a media data file encoded according to an existing compression standard is stored on hard drive 235 of STB 200, it may be desirable transcode the media data file so as to increase the storage capabilities of hard drive 235. Therefore, streaming 400 a data file from interface 225 may include retrieving 407 the data file from hard drive 235 and streaming 415 the data file to one of transcoding modules 300, 300A, or 300B. Since the transcoder modules 300 and 300A are adaptive modules in FIGS. 1-3, the data file may be streamed using an existing interface protocol, including, but not limited to, USB2.0 or P1394. In the example embodiment of FIG. 4, where transcoder module 300C is integrated with STB 200, the subject data file may be transferred to transcoder module 300 via bus 216, as shown in FIG. 6.

Transcoding 425B of the data file, by either of a hardware-based iterative process or a software-based algorithm, is described with reference to FIGS. 1-4. In particular, hardware-based iterative transcoding may include a decoder in the respective one of transcoder modules 300 or 300B receiving the data file, encoded in accordance with the existing compression standard, from interface 225, and decoding the data signal stream into raw data signals. The raw data signals may be encoded in accordance with the advanced-compression standard.

In the example embodiment of FIG. 3, transcoding module 300A, may implement software-based transcoding of the data file by executing a mathematical transformation of the data file from the existing compression standard to the advanced-compression standard. Such transcoding may even be implemented by a software-based, transcoding module 300B, shown in FIG. 4. Regardless of the mode of transcoding, the transcoded data file may be streamed 450B back to interface 225. Interface 225 may then send the transcoded data file to hard drive 235 for storage 475B therein.

To play back the transcoded data file, the data file must be transcoded once again, so that it is encoded in accordance with the existing compression standard. Referring back to the flow-chart of FIG. 7, interface 225 may retrieve the transcoded data file for streaming 400 to one of modules 300 or 300A using an existing interface protocol, or for streaming to module 300B via bus 216. Using a hardware-based iterative process, transcoder modules 300 and 300B may include a decoder that receives the data file from interface 225, determines the algorithm by which the file is encoded, and thus decodes the data file into raw data signals. An encoder within the transcoder module 300 or 300B may encode the raw data signals in accordance with the existing compression standard. Alternatively, software-based transcoding by transcoding module 300A of FIG. 3 or module 300B of FIG. 4 may include a mathematical transformation of the data file from the advanced-compression standard to the existing compression standard, i.e., MPEG-2. Regardless of the mode of transcoding, the transcoded data file may be streamed 450B back to interface 225. Interface 225 may send the transcoded data file to decoder 250 for decoding, and then display by TV 100.

Figure 10:
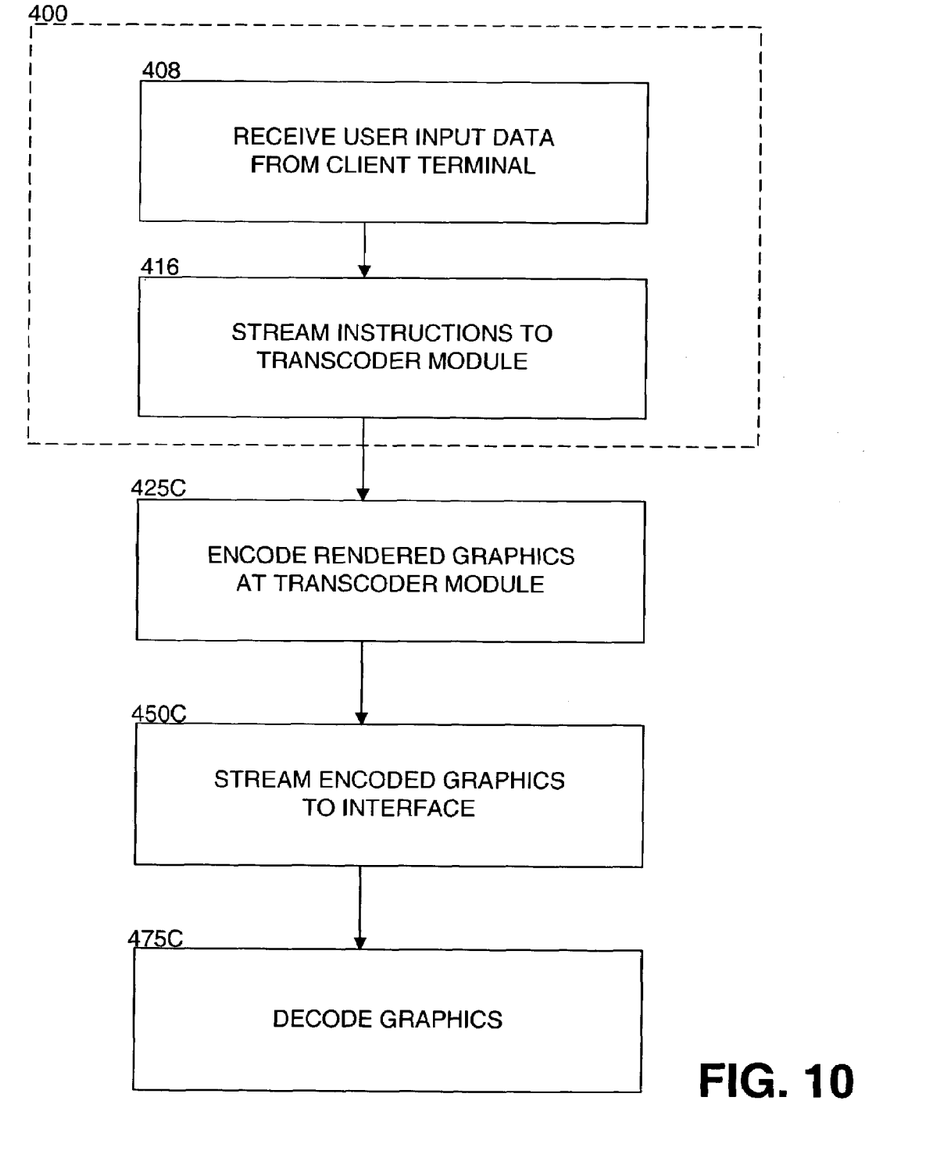
FIG. 10 is an example flow-chart further to the example embodiment of FIG. 7.

In FIG. 10, corresponding to an interactive gaming scenario described in reference to FIG. 5, user input is received 408 at STB 200. The user input may include gaming instructions from the user control device of STB 200 and/or, in the event of other on-line gaming participants, instructions received at STB 200, e.g., via IP packets. The input instructions are streamed 416 continuously to module 300C. The transcoding 425C may include graphics engine 370 in transcoder module 300C that continuously renders sequential frames of video data for the interactive game based on the stream of user instructions received from interface 225. The data may be encoded according to the existing compression standard at a high bit-rate, e.g., MPEG-2, by encoder 375, and the encoded graphic data signals may be streamed 450C back to interface 225. The transcoded graphic data may be decoded 475C and delivered to the user.

As set forth above, the present invention provides a cost-effective manner for upgrading the decoding capabilities for an STB in view of advancements for video and audio codec standards. It may be understood that, while the above-description include specific reference to codec standards for video data signals, the systems and methods described above are applicable to audio codec standards, as well.

While specific embodiments and applications of the present invention have been illustrated and described, it is to be understood that the invention is not limited to the precise configuration and resources disclosed herein. Various modifications, changes, and variations apparent to those skilled in the art may be made in the arrangement, operation, and details of the methods and systems of the present invention disclosed herein without departing from the scope of the claimed invention.

Reference has been made throughout this specification to "one embodiment" or "an embodiment" meaning that a particular described feature, structure, or characteristic is included in at least one embodiment of the present invention. Thus, usage of the phrases "in one embodiment" or "in an embodiment" throughout this specification may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well-known structures, materials, or operations have not been shown or described in detail merely to avoid obscuring aspects of the invention.

What is claimed is:

1. A system to adapt compressed media data, comprising:
   a client terminal interface configured and arranged to stream video data encoded according to a first compression standard;
   an adaptive module configured and arranged to transcode the video data from the first compression standard to a second compression standard, and to further stream the transcoded video data to the client terminal interface, wherein the client terminal interface is configured and arranged to further relay a user input to the adaptive module, and wherein the adaptive module is configured and arranged to further perform graphics processing on the video data based on the user input, and to further encode the processed video data in accordance with the second compression standard; and
   a client terminal processor configured and arranged to process the transcoded video data.

2. A system according to claim 1, wherein the client terminal interface is configured and arranged to receive the video data in a media stream including meta-data that indicates the compression standard of the video data.

3. A system according to claim 1, wherein to transcode the video data includes:
   to decode the video data into raw video data, and
   to encode the raw video data to the second compression standard.

4. A system according to claim 1, wherein the client terminal processor is configured and arranged to decode the transcoded video data.

5. A system according to claim 1, further comprising a hard drive, and wherein the client terminal processor is configured and arranged to store the transcoded video data in the hard drive.

6. A system according to claim 1, wherein the first compression standard includes MPEG-2.

7. A system according to claim 1, wherein the first compression standard includes any one of JVT, Windows Media 8, and RealVideo 9.

8. A system according to claim 1, wherein the second compression standard includes I-Frame only MPEG-2.

9. A system according to claim 1, wherein the second compression standard includes any one of JVT, Windows Media 8, and RealVideo 9.

* * * * *